(12) United States Patent
Ellis

(10) Patent No.: US 6,481,261 B1
(45) Date of Patent: Nov. 19, 2002

(54) FEED MECHANISM

(75) Inventor: Darren James Ellis, Castleford (GB)

(73) Assignee: Meltog Limited, Birstall (GB)

( * ) Notice: Subject to any disclaimer, the term of this patent is extended or adjusted under 35 U.S.C. 154(b) by 0 days.

(21) Appl. No.: 09/560,748

(22) Filed: Apr. 28, 2000

(30) Foreign Application Priority Data

May 1, 1999 (GB) ............................................. 9910061
May 27, 1999 (GB) ............................................. 9912262

(51) Int. Cl.[7] ............................................. B21J 11/00
(52) U.S. Cl. ................ 72/405.11; 72/405.5; 72/405.13; 72/405.16; 413/3; 413/70
(58) Field of Search .................... 413/3, 70; 72/405.05, 72/405.11–405.13, 405.14, 405.16

(56) References Cited

U.S. PATENT DOCUMENTS

| | | | | |
|---|---|---|---|---|
| 3,552,629 A | * | 1/1971 | Armbruster et al. | 228/1.1 |
| 3,811,522 A | | 5/1974 | Wolf et al. | |
| 4,199,288 A | | 4/1980 | Ganz et al. | |
| 4,269,015 A | * | 5/1981 | Woods et al. | 53/218 |
| 4,382,395 A | * | 5/1983 | Haar | 271/14 |
| 4,382,737 A | * | 5/1983 | Jensen et al. | 413/56 |
| 4,607,516 A | * | 8/1986 | Schafer et al. | 72/405.12 |
| 4,947,014 A | * | 8/1990 | Rolli et al. | 219/64 |
| 6,012,312 A | * | 1/2000 | Bezkorow | 192/126 |
| 6,142,050 A | * | 11/2000 | Miki | 83/155 |

FOREIGN PATENT DOCUMENTS

| | | |
|---|---|---|
| DE | 3347 198 A1 | 6/1984 |
| EP | 0 577 943 A1 | 1/1994 |
| EP | 0 708 041 a1 | 4/1996 |

* cited by examiner

*Primary Examiner*—William Hong
(74) *Attorney, Agent, or Firm*—Bell, Boyd & Lloyd LLC

(57) ABSTRACT

There is described a feed mechanism for a feed table for translating sheet metal blanks from as automatic notching curling and beading machine to a bodymaker in the process of tin box manufacture. The mechanism comprises a pair of reciprocally drives longitudinal feed bars provided with spring loaded pawls in their upper surfaces which engage behind the edges of the blanks during a forward motion and slide beneath the blanks during a reverse motion. The difficulty of altering the lateral displacement of the respective feed bars to allow the table to transfer blanks of different sizes is overcome by using a telescopic fixing member which can be extended to an infinitesimal degree and then secured. In practice, both the longitudinal feed bars are secured to a reciprocally driven transfer table within the stationary feed table, and it is the connection of the feed bars to this table that is achieved with telescopic fixing members. Additionally, the feed bars may be disposed in guide means for both support and to ensure precisely linear back and forth motion parallel with the central axis of the table. In this manner reliable and trouble free transfer of blanks is effected.

14 Claims, 3 Drawing Sheets

FEED MECHANISM

This invention relates to a feed mechanism, and more specifically to a feed mechanism specifically adapted for user in machinery for the automated manufacture of tin boxes.

BACKGROUND OF THE INVENTION

Automated tin box manufacture is accomplished by juxtaposing several different pieces of machinery said providing transfer means therebetween tin boxes can be manufactured is a vast number of different shapes and sizes and accordingly a single piece of machinery is required to be sufficiently versatile to enable manufacture of tin boxes in a large number of said shapes and sizes. It will be understood by those skilled in the art that the machinery need has a number of different components which can be exchanged to facilitate the manufacture of different boxes and currently the length of time taken to exchange all these various components to enable a particular set of machines to manufacture a different box shape can be up to an entire day. The invention hereinafter set forth, and slap set forth is our co-pending applications have as their object the reduction of this time. Any reduction achievable is the "changeover" time is especially desirable when it is considered that tin box production rates using the machinery described hereinafter may reach 40 per minute.

Tin boxes can contain a wide variety of different goods, such as bottles, chocolates, biscuits, tea, coffee and the like. Manufacturers of such products commonly consider the containment of their product in tins because of the rigidity and durability which the sheet steel, from which such tins are commonly made, provides. Additionally, the containment of a product in a tin box may also suggest that the product therein is of a certain quality, especially as ornate and detailed print effects can be obtained on the surface of the metal plates from which the tin boxes are manufactured. Such effects cannot be achieved, or are achieved snip to a much lesser degree by the containment of products in cardboard cartons or receptacles of plastics materials. A tin box in which such a product as contained has the further advantage of being reusable to contain other household items such as screws, nuts bolts, pencils and pens, etc. after the product originally contained therein has been consumed or otherwise utilised.

The various separate machines required in the manufacture of tin boxes are an "Automatic Curling Notching and Beading" machine, a "bodymaker", a "round and irregular seamer", and an "end feeder", each of which has a specific task to perform during the process of tin box manufacture. Each of these is now described.

The first stage in the process of automated tin box manufacture is the profiling of a simple sheet steel, and generally rectangular blank from which the walls of the tin box are ultimately constituted. The blank is fed through an "Automatic Notching, Curling and Beading" machine, referred to hereinafter as an ANCB machine. This machine consists of a plurality of consecutively drives rollers disposed both above and below the blank as it passes therebetween each of said rollers performing a forming step on the blank. The particular profile of each blank as it exits the ANCB machine depends on the ultimate shape of the tin, but in general the blank is substantially flat with the exception of a hem provided parallel with one of the longer edges of the blank and proximate thereto, a bead is provided on one of said longer edges, a partial curl is provided around the alternate longer edge, and a pair of hooks oppositely disposed with respect to one another on the shorter edges. Additionally the ANCB machine has cutting means which catch the corners of the blank to preclude any interference effects which may be caused by said corners either when the blank is profiled and provided with the hooks along its shorter edges, when it is formed into the cross-sectional shape of the tin box, or when wrapped around and attached to the base of said tin box.

The hem provides a surface behind which the beaded lip of a tin lid can engage to inhibit the removal of a lid separately formed and applied around the uppermost edge of the tin box, the bead is provided to hide the sharp longer edge of the blank which ultimately forms said uppermost edge of the tin box, the partial curl on the alternate longer edge of the blank is provided to facilitate the attachment of the blank, after same has been formed into the desired cross-sectional shape, to the base of the tin box, and the hooks provided along the shorter edges of the blank facilitate the connection of said edges to one another after the forming operation. In practice, the bodymaker may be responsible for the formation of the hooks on the shorter edges of the blank to facilitate connection of said edges to one another.

The profiled blank is then fed from the ANCB machine into a bodymaker by a feed mechanism forming an integral part of the bodymaker which generally comprises a pair of reciprocating feed bars whose motion is best described is being that of a "walking beam" is conjunction with "disappearing guides" which simultaneously urge the profiled blank towards and over a forming mandrel and precisely align said blank thereon. The disappearing guides are rotated away from the blank when it is held in contact with the uppermost portion of the mandrel, which is generally of similar shape to the desired cross-sectional shape of the tin box to be manufactured, by a mandrel clamping arrangement. The removal of the disappearing guides (so-called because they are retracted and seem to "disappear" within the machine during the forming of the blank ground the mandrel) allows a pair of forming wings pivotally connected together and disposed above the mandrel to rotate about their pivot and form said blank, which is at this stage still substantially planar, around the said mandrel. The forming operation performed by the wings also constrains the oppositely disposed hooks on the shorter edges of the blank to interlock on the underside of the mandrel whereupon a second forming tool compresses the metal of the blank in the interlocked region to form the vertical team within the wall of the tin box. During all forming operations the blank is clamped against the upper surface of said mandrel by said mandrel clamping arrangement.

This invention is specifically concerned with the provision of a novel feed mechanism.

The feed mechanism currently used to transfer the pressed blanks from the ANCB machine through the bodymaker is now described. The profiled but substantially planar blanks exit the ANCB machine onto a pair of pivotable drop rails which both guide and support the blank as a travels until it contacts a stopping member. The pivotable guide rails are actuated with a predetermined frequency which corresponds to the rate at which the profiled blanks are fed into and exit the ANCB machine and also to the rate at which the said blanks can be fed through the bodymaker. On acruation, which is typically effected by a cam arrangement, both a drop rails swing outwardly and away from each other such that the bank supported thereby falls onto a pair of parallel feed bars disposed with a feed table, said feed bars reciprocally traveling in a "walking beam" type manner in a direction perpendicular to the direction of travel of the blanks exiting the ANCB machine.

Each of said feed bars is provided with a plurality of spring loaded pawls which engage behind one of the edges of the blank as it tests thereon of on the feed table, and these pawls urge the blank through the bodymaking machine.

The feed table on which the blank travel in generally symmetrical about an axis parallel to the direction of travel of the blanks thereon and is substantially hollow to allow the feed bars and driving machinery to operate unhindered therein. The feed bars are rigidly secured with bolts or the like to a feed bar transport supported end freely slidable on horizontal guide rails whose length is marginally less than the length of the feed mechanism. Although the feed bars are sufficiently separated to provide a certain degree of stability for the blanks being transported thereon into the bodymaker, the requirement for precision placement of the blanks on the mandrel of the bodymaker is such that stationary guide means are also required at each side of the feed bars to ensure that the orientation and positioning of the blank on said feed bars is correct. Accordingly, such guide means are rigidly secured to the feed table and come into contact with the edges of the blank which are perpendicular to that behind which the pawls are engaged.

As mentioned above there are a plurality of spring loaded pawls provided on each feed bar and in general there are three pairs of pawls, the pawls of each pair being disposed a predetermined distance from an end if the particular feed bar which is dependent on the length of travel of the said feed bars and also on the size of the blank supported thereby. The purpose of providing three pairs of pawls is to allow for three separate blanks to be simultaneously moved by said feed bars, each blank being at a different position thereon and being moved by a separate pair of pawls engaged behind one of the edges of said blank. After the feed bar has reached the extent of its travel in one direction and urged the blanks supported thereon towards and/or into the body forming tools of the bodymaking machine, the direction of travel of said bars reverses. The blanks do not however return to their original positions with the feed bars as the pair of opposite edges of said blanks an either side of and parallel with the feed bars frictionally engage the guide means which retain the blank is that position. Additionally the spring loading of else pawls, their profiled shape and their pivotable mounting within the feed bars allows said pawls to slide under the leading edge of the blanks retained in the guide means and springingly emerge in front of the opposite trailing edge with which the booked portions of the pawl can engage to urge said blank along the feed table.

Hence, the blanks are intermittently moved forward on the feed table and through the bodymaking machine on the reciprocating feed bars. It will now be understood that the timing of all the various machinery operations and transfers between separate pieces of machinery is critical in maximising the overall throughput of the machine. In practice, the timing of all the various operations and transport mechanisms is controlled by computer apparatus.

The blank feed mechanism described above is adequate for transferring blanks of a particular size and shape from the ANCB machine to the bodymaker, but as described above all those machines involved in the automated manufacture of tin boxes are required to be sufficiently versatile to accommodate blanks and bases of different sizes and shapes, and the feed mechanism described is severely disadvantaged in this respect. It will be appreciated that the feed bars must be capable of being displaced towards or away from one another within the feed table to permit the transfer of smaller or larger blanks and the position of the guide means on either side of the feed bars must also be capable of being altered. Furthermore, it is essential that each of these components can be rigidly secured to the transfer table and feed table respectively after movement to ensure continued precise operation of the transfer mechanism.

In current feed mechanisms an anvil is rigidly secured by bolts to either side of the transfer table and it is to said anvils that the feed bars are attached, also with bolts, and symmetrically of the transfer table. The anvils are provided with a plurality of attachment locations to allow said feed bars to be attached thereto at a number of different separations to allow for the transfer of blanks of different sizes thereon. The intricacy of the machinery surrounding the transfer table, anvils and feed bars makes the changeover process unavoidably time consuming, Although the description provided hereinabove and hereinafter relates almost exclusively to feed mechanisms used to transfer profiled blanks through the bodymaker during tin box manufacture, it is to be pointed out that the feed mechanism of the invention has far wider application. Indeed it is considered that the feed mechanism hereinafter described may be used in any circumstance where bodies, blanks or the like are to be carried on a pair of supports whose separation distance is required to be occasionally altered to accommodate differently sized bodies.

BRIEF SUMMARY OF THE INVENTION

It is an object of this invention to provide a feed mechanism having at least a pair of feed bars, the separation distance between which can be altered as required simply, quickly and efficiently without compromising the precision with which said feed mechanism must operate.

According to the present invention there is provided a feed mechanism comprising a stationary feed table within which is disposed a drives transfer table to which a first support means is attached, a further second support means being provided within, the feed table at a separation distance from said first support means, characterised in that first and/or second support means are connected by telescopic means whose extension can be altered and securely set.

Preferably, both the first and second support means are connected by telescopic means whose extension can be altered and securely set.

Preferably the support means are longitudinal feed bars which are parallel.

Preferably the transfer table is reciprocally driven and thus imparts reciprocal motion to the said first feed bar and concomitantly to said second feed bar through its telescopic connection with the first.

Preferably feed bars are provided with pawls which engage behind the bodies which the feed mechanism is adapted to move to move same when said reciprocating motion is in a forward direction, and which slide underneath the said bodies when said reciprocating motion is in a reverse direction.

Preferably the pawls are spring biased and can be depressed so as to be flush with the upper surface of the feed bars when sliding underneath the said bodies which are frictionally held along a pair of opposite edges and thus do not slide is the reverse direction with said feed bars.

Preferably the transfer table is provided with guide bars which extend perpendicularly to the direction of travel of said transfer table and towards and underneath the feed bars, and which are provided with location means to ensure the parallel orientation of said feed bars.

Preferably the connection of the telescopic means to the transfer table at one end of said telescopic means, and to the feed bars at their alternate ends is effected using rose bearings which allow a degree of play during the alignment process.

Preferably, the feed bars can be disposed at one of a number of distances from the transfer table, and further preferably each feed bar can be disposed in one of five different positions.

Hence, the motion of bodies to be transferred between one location and another by said feed mechanism is discontinuous and discrete as is required in automated processes which comprise a number of discrete steps, but the case, simplicity and speed with which the feed mechanism can be altered to accommodate blanks of different shapes and sites is drastically increased using the telescopic means as described above and hereinafter. When it is desired to change the separation of the feed bars, the rose bearings which connect the telescopic member and also the extension lock thereon are simply loosened, the feed bars are then lifted from one position and moved towards or away from the transfer table as required and dropped back into one of the alternate locations provided by the guide bars. The bearings and the extension lock of the telescopic members are then tightened to lock the feed bars in position.

BRIEF DESCRIPTION OF THE DRAWINGS

A specific embodiment of the invention is now described by way of example only and with reference to the accompanying diagram wherein.

DETAILED DESCRIPTION OF THE INVENTION

Figure 1:
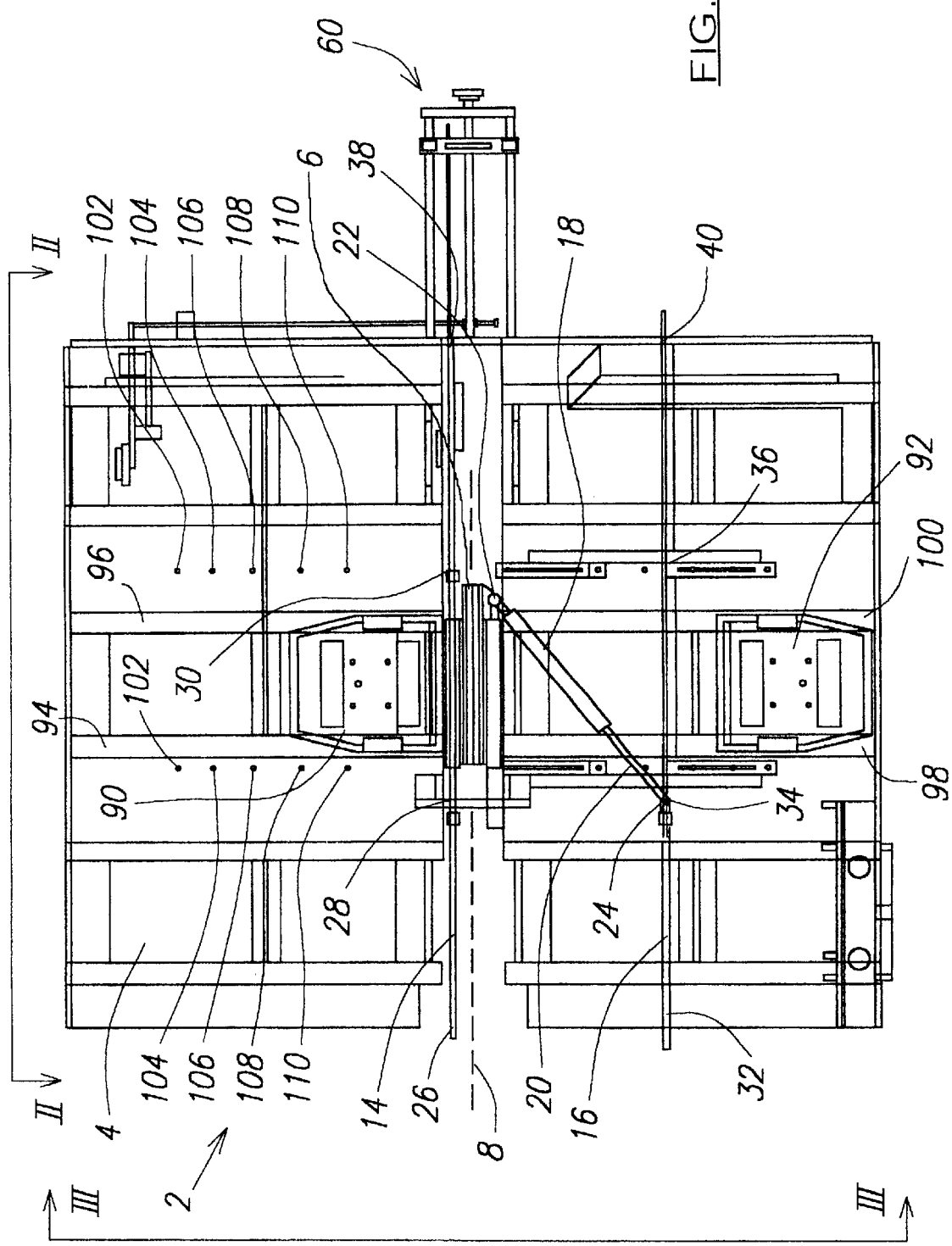
FIG. 1 shows a plan view of a field mechanism according to the invention.
Figure 3:
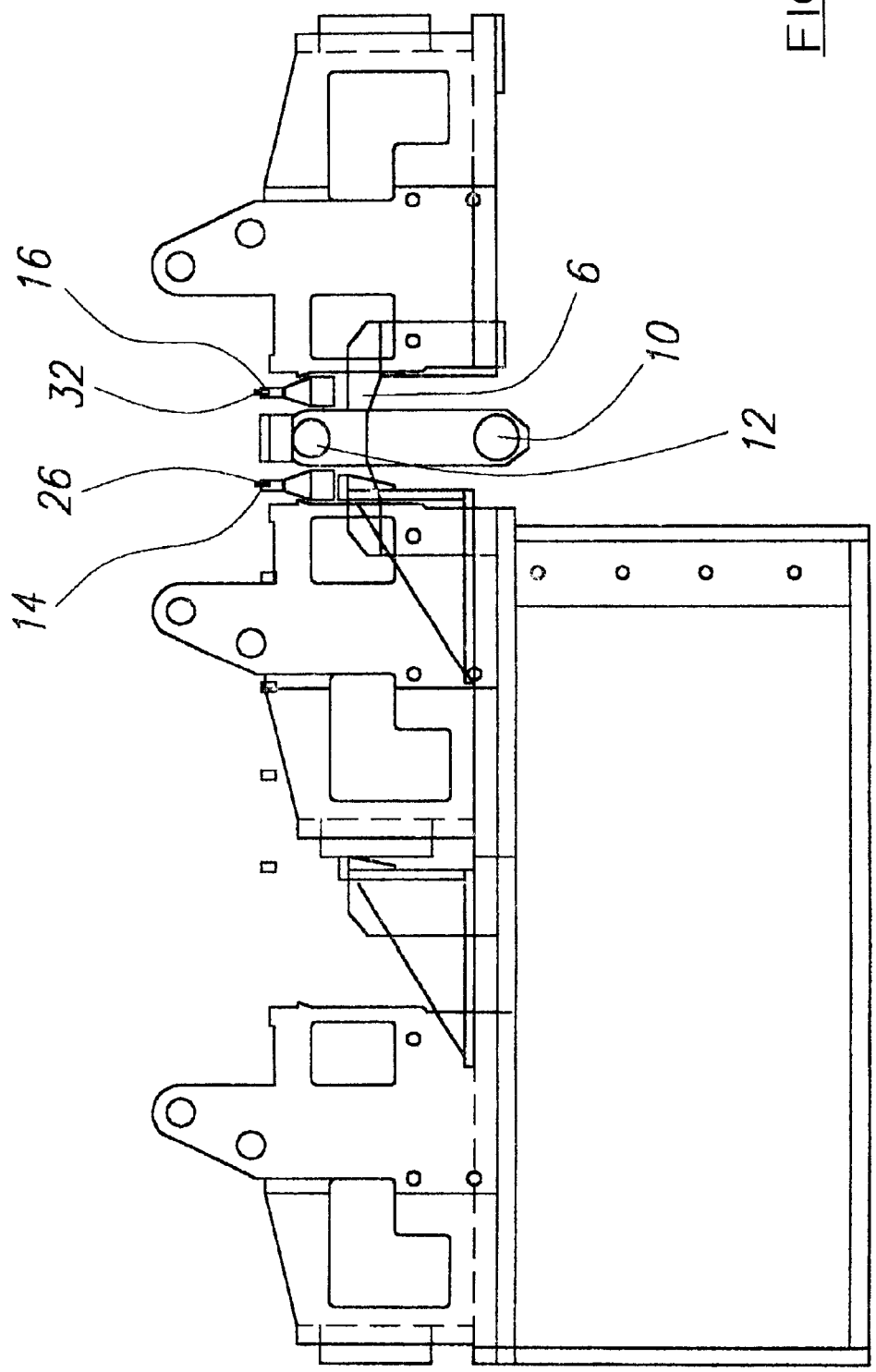
FIG. 3 shows an end elevation of the feed mechanism of FIGS. 1, 2.

Referring firstly to FIG. 1 there is shown a feed mechanism indicated generally at 2 comprising a stationary feed table 4 and a driven transfer table 6 which is constrained to travel along a line substantially parallel with the central axis 8 of the table 4. The transfer table a slides along guides 10, 12 which are clearly shown in FIG. 3.

A first feed bar 14 and a second feed bar 16 are connected to said transfer table by means of diagonally disposed telescopic cylinders, one of which is shown at 18, from which a piston rod 20 protrudes. The cylinder 18 and the rod 20 are provided at their ends with rose bearings 22, 24 which allow a certain degree of play between the respective components when loose. This ensures both that a safe angle of inclination of the diagonal telescopic member can be achieved between the transfer table and said second feed bar (to prevent any jack-knifing or other undesirable jamming during the reciprocal motion of the transfer table), and also allows said second feed bar to be jostled slightly during positive thereof to ensure that it can be dropped into an alternate location without requiring disconnection from said piston rod 20. It should be mentioned that the connection of the first feed bar 14 using rose bearing as described above with reference to the second feed bar is generally identical.

The telescopic cylinder 18 is provided with extension locking means (not shown) which can be tightened up to ensure that the orientation of feed bar 16 with respect to the feed bar 14 is maintained after alignment. Additionally, the element of play provided by the rose bearings can be eradicated by suitable tightening thereof before operation of the feed mechanism.

As can be seen from the figure, the feed bars 14, 16 are of identical length and their ends are aligned so that spring loaded pawls 26, 28, 30 on the first feed bar 14 are in alignment with identically disposed pawls 32, 34, 36 provided on the second feed bar 16. Similarly, a lug 38 provided at the rear end of the first feed bar is in alignment with a similar lug 40.

Figure 2:
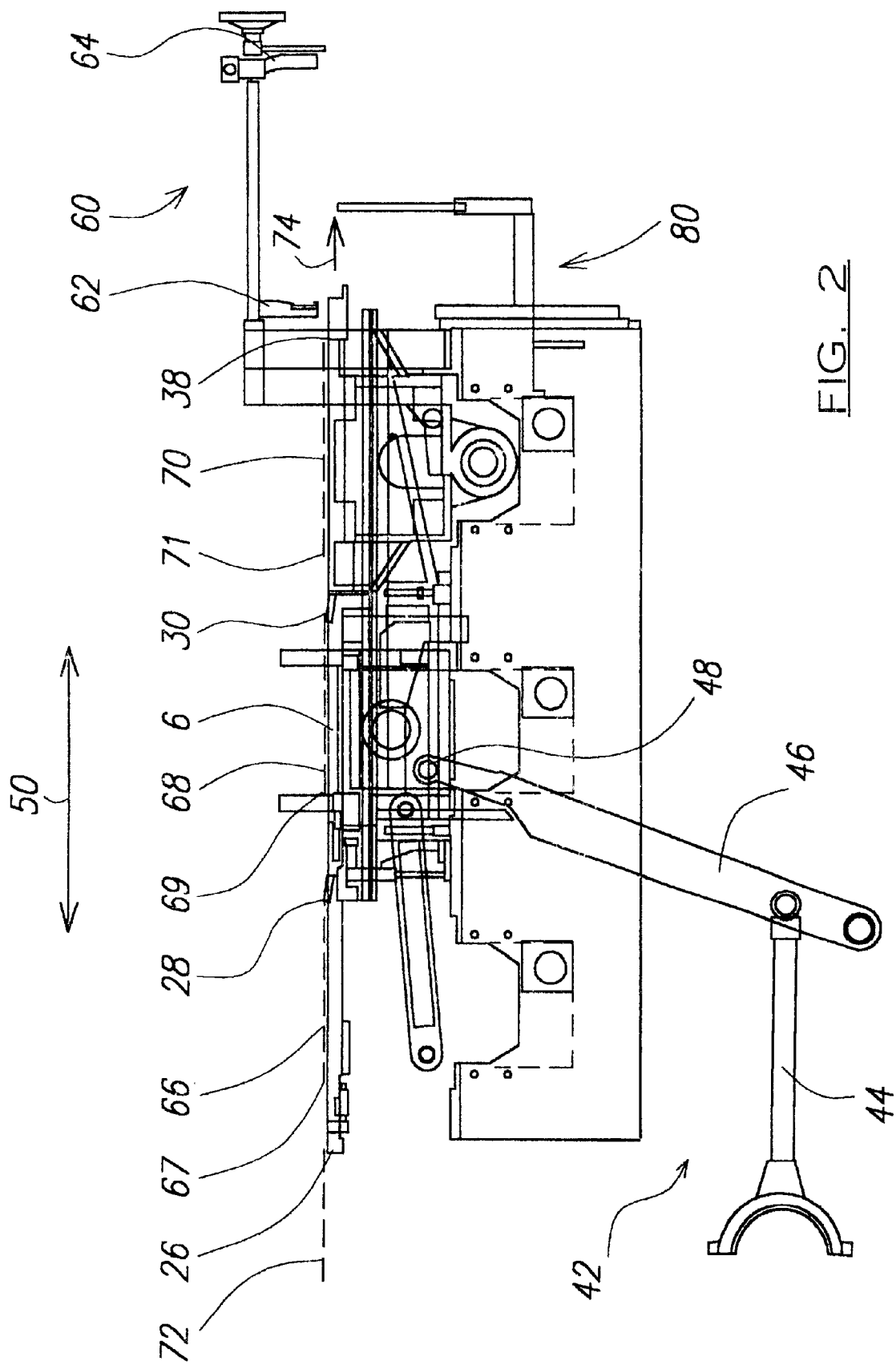
FIG. 2 shows a side elevation of the feed mechanism of FIG. 1.

Referring to FIG. 2 a simple reciprocating drive mechanism 42 comprising a connection rod 44 and a drive member 46 is connected to the transfer table 6 of 48 and the rotational motion of an eccentric drive shaft (not shown to which the connection rod is connected thus urges said transfer table, and thus both feed bars back and forth as shown at 50. In the position shown in the figures, the feed bars 14, 26 are at the extremity of their forward motion, and on the point of returning towards a position is which the first portion of their lengths defined between the lugs 38, 40 and the most rearward pawls 30, 36 is disposed entirely underneath a blank drop mechanism 60.

In use, profiled blanks exit an ANCB machine and are supported above the feed mechanism by a pair of drop rails 62, 64 which, on actuation the timing of which is dependent on the motion of the reciprocation mechanism 42, rotate outwardly of one another to drop the said blank onto the feed bars which are at that time disposed underneath said drop mechanism. The lugs 38, 40 engage behind an edge of said blank and urge same onto the feed table 4 Where the pair opposite edges of said blank which are perpendicular to the edge behind which the lugs engage come into frictional contact with edge retaining means (not shown) disposed on said feed table.

The feed mechanism and the feed bars shown in the figures are configured to support three separate blanks at any one time, and at the extremity of forward travel of said feed bars, a fourth blank 72 is urged off the table 4 and into region of the bodymaking machine comprising the forming tools (not shown).

The pawls 26, 28, 30, 32, 34 ,36 are spring loaded to protrude above the upper surface of the feed bars 14, 16 but when the feed bars move is their reverse direction as shown at 74, the front side of said pawls is inclined such that they are depressed into recesses provided in the feed bars by the leading edges 67, 69, 71 of the blanks and thus the blanks remain stationary during with reverse motion. The pawls only emerge again behind the trailing edge of the blank immediately preceding that which was caused to move forward by that particular pair of pawls. Obviously, there is no requirement for spring loaded pawls at the rear ends of the feed bars because there is no requirement for such to slide under a blank which is held sufficiently above said feed bars the by the drop rails 62, 64 not to interfere with such during their travel thereunder.

A drop rail actuation mechanism 80 ensures that the drop rails 62, 64 rotate outwardly to drop a blank supported thereby onto the feed bars only when said feed bars are at the extremity of their rearward travel and thus correctly disposed underneath said drop rails.

It will be noted from FIG. 1 that only the second feed bar 16 is shown remote from the transfer table 6 and connected hereto by the telescopic cylinder 18 and that a pair of guide members 90, 92 are movably mounted on the feed table 4 to provide a means of guiding the edges of blanks being consecutively urged along the feed table by the reciprocating feed bars 14, 16. In the Figure, the first feed bar is proximate the transfer table 6 whereas the second feed bar 16 is remote, and the central axis of the blanks translated along the feed table by the feed bars is thus laterally offset from the central axis of said feed table within which said transfer table reciprocates.

There is no requirement for such an offset, and indeed the guide means 90, 92 may be moved laterally towards and away from the central axis 8 as required by the particular dimensions, the shape of the blank being transferred, and the particular configuration and location of the blank drop mechanism 60. The flexibility offered by the feed table arrangement described herein is enhanced in that the guide means 90, 92 are ideally servo-controlled and precisely moveable within lateral channels 94, 96, 98, 100. This facility allows for particularly quick re-setting of the machine components to enable a differently sized and shaped blank to be translated thereover.

The feed mechanism is further enhanced in that the feed bars are disposed and freely movable in guide bars (not shown in the interests of clarity) which both support the feed bars and constrain their motion to be precisely parallel with the central axis 8 of the feed table. In other words, said guide bars provide lateral support for the feed bars along substantially their entire length to prevent any lateral sway, judder or whipping of said feed bars as they are moved rapidly and reciprocally within the table. These guide bars are provided internally with roller bearings to allow substantially frictionless motion of the feed bars therewithin and with spigots on their lowermost surfaces which are received in a plurality of aperture pairs drilled in the feed table upper surface on either side of the central axis shown for one side of the table at 102, 104, 106, 108, 110. It will be appreciated that said aperture pairs could be replaced with pairs of lateral slots which would allow the feed bars to assume a practically infinite number of lateral displacements from the central axis of the table.

The guide bars can be securely affixed to the stationary feed cable in one of a plurality of locations and this further increases the flexibility and versatility of the table. Indeed by this arrangement either feed bar can be disposed it one of a number (possibly infinite as mentioned above) of distances from the transfer table determined by the lateral distance of the aperture pairs drilled in the feed table from said central axis. This ensures that the blanks are translated reliably and without hindrance in a precisely linear fashion over the table without snagging or twisting. Furthermore, the various components of the machine can be altered to ensure that the pawls engaged behind the edges of the blanks are substantially symmetrically disposed of the central axis of the blank to avoid any twisting motion of said blank.

In the embodiment shown in FIG. 1, there are five aperture pairs on either side of the central axis which is sufficient in most circumstances.

What is claimed is:

1. A feed mechanism comprising a stationary feed table within which is disposed a driven reciprocating transfer table to which a first and second support means being longitudinal feed bars are attached, said second support means being provided within the feed table at a separation distance from said first support means, characterised in that at least one of said first and second support means are connected to the transfer table by telescopic means whose extension can be altered and securely set.

2. A feed mechanism according to claim 1 characterised is that the both the first and second longitudinal feed bars are connected to the transfer table by telescopic means whose extension can be altered and securely set.

3. A feed mechanism according to claim 1 characterised in that the longitudinal feed bars are parallel.

4. A feed mechanism according to claim 1 characterised is that the longitudinal feed bars are provided with a substantially planar upper surface on which a body can be transferred thereby over said transfer table and the connection of road longitudinal feed bars to said transfer table ensures that the uppermost surfaces of said feed bars are coplanar.

5. A feed mechanism according to claim 4 characterised in that the upper surfaces of said longitudinal feed bars are provided a plurality of pawls identically spaced on each feed bar the connection of said longitudinal feed bars to said transfer table ensuring that the respective pawls on respective feed bars are in perfect or near perfect alignment.

6. A feed mechanism according to claim 5 characterised in that the pawls are hingedly secured within the longitudinal feed bars and are provided with gradually inclining surfaces which at one end of the pawl are flush with the upper surface of said longitudinal feed bar, said gradually inclining surfaces inclining away from the said one end upwardly of the upper surface of said longitudinal feed bars but ending abruptly at the alternate ends of said pawls to define faces which engage behind a body which the feed mechanism is adapted to move over said table, movement of said body being effected when the motion of the table is in a forward direction and the faces force the bode forward, said pawls being deflected inwardly of said longitudinal feed bars about the hinge and sliding underneath the said bodies when the motion of the table is in a reverse direction.

7. A feed mechanism according to claim 6 characterised in that the pawls are spring biased and can be depressed so as to be entirely flush with the upper surface of the feed bars when sliding underneath the said bodies.

8. A feed mechanism according to claim 7 characterised in that movable guide means are provided on either side of the transfer table to guide the movement of the body said transfer table.

9. A feed mechanism according to claim 8 characterised in that the guide means are movable laterally of the transfer table under servo control.

10. A feed mechanism according to claim 1 characterised in that the transfer table is provided with guide bars which extend parallel to a central axis of said feed table, said guide bars constraining the motion of said feed bars to be linear and having location means interacting with the stationary feed table to ensure the parallel orientation of said feed bars, both with each other and with said central axis.

11. A feed mechanism according to claim 10 characterised in that the location means on the guide bars comprises spigots which are received in aperture pairs drilled in the surface of the feed table, each aperture pair being aligned parallel with the central axis of said feed table to ensure an orientation of said guide bars precisely perpendicular to the central axis of the feed table which results in precisely linear motion of said longitudinal feed bars parallel with said central axis.

12. A feed mechanism according to claim 11 characterised in that the feed bars can be disposed at one of a number of distances from the transfer table determined by the lateral distance of the aperture pairs drilled in the feed table from said central axis.

13. A feed mechanism according to claim 12 characterised in that there are five aperture pairs on either side of said central axis so that each longitudinal feed bar can adopt one of five different lateral positions.

14. A feed mechanism according to claim 1 characterised in that the connection of the telescopic means to the transfer table at one end of said telescopic means, and to the feed bars at their alternate ends is effected using rose bearings which allow a degree of play during the alignment process.

* * * * *